United States Patent [19]

Salgado et al.

[11] Patent Number: 5,305,056
[45] Date of Patent: Apr. 19, 1994

[54] METHOD OF CONTROLLING DIAGNOSTICS IN A PRINTING SYSTEM

[75] Inventors: David L. Salgado, Victor; Nicholas P. Osadciw, Webster, both of N.Y.

[73] Assignee: Xerox Corporation, Stamford, Conn.

[21] Appl. No.: 75,990

[22] Filed: Jun. 11, 1993

[51] Int. Cl.$^5$ .......................................... G03G 21/00
[52] U.S. Cl. ................................. 355/202; 355/204; 358/403; 395/650
[58] Field of Search ............... 355/200, 202, 203, 204; 358/296, 403, 437, 448; 395/600, 650

[56] References Cited

U.S. PATENT DOCUMENTS

| | | | |
|---|---|---|---|
| 4,206,995 | 6/1980 | Legg | 355/204 |
| 4,876,562 | 10/1989 | Suzuki et al. | 355/202 |
| 4,970,554 | 11/1990 | Rourke | 355/202 |
| 4,972,226 | 11/1990 | Kawai | 355/202 |
| 5,045,880 | 9/1991 | Evanitsky et al. | 355/200 |
| 5,170,340 | 12/1992 | Prokop et al. | 355/202 X |
| 5,202,726 | 4/1993 | McCulley et al. | 355/206 |
| 5,251,297 | 10/1993 | Takayanagi | 355/200 X |

Primary Examiner—A. T. Grimley
Assistant Examiner—William J. Royer
Attorney, Agent, or Firm—Gary B. Cohen

[57] ABSTRACT

There is provided a method of performing a service on a job with a printing system in which the printing system is selectively operable in a first system mode and a second system mode. The method includes the steps of programming the job with instructions for directing the printing system to perform a selected service on the job with the programming step being performed in a selected one of the first system mode and the second mode. Additionally, the job is provided with a job tag for indicating the system mode in which the job was programmed. Finally, the system mode in which the printing system resides is determined and the job tag is compared with the determined system mode prior to performing the print-related service on the job. Preferably, the selected service is performed on the job when the system mode indicated by the job tag is the same as the determined system mode.

20 Claims, 17 Drawing Sheets

FIG. 9

METHOD OF CONTROLLING DIAGNOSTICS IN A PRINTING SYSTEM

The present invention relates generally to a diagnostic technique for a printing system, and, more particularly, to an improved method for prohibiting jobs programmed in one system mode from being processed while the printing system is in another system mode.

As development in the area of electronic printing progresses, the availability of multi-functional printers increases dramatically. One example of an electronic printer that can perform various services on a print job concurrently, such as scanning, editing and printing, is the DocuTech ® printer manufactured by Xerox ® Corp. One version of the DocuTech ® printer is network capable, i.e. it is adapted to function as a "stand-alone" printing machine or as a network printing machine receiving print jobs via a network input or connection. In one example of operation of the DocuTech ® printer, a customer can create a print job on the printing machine or capture a network print job by way of the network input. Typically, these customer-created jobs are serviced in a system mode, referred to as a "customer mode".

Under certain circumstances, a printer is unable to perform one or more services on a print job due to one or more system malfunctions. In the DocuTech ® printer, for example, system malfunctions are managed through use of an implementation which is accessible when the printer is in a mode referred to as a "diagnostic mode". To perform diagnostics on the DocuTech ® printer, a customer service representative ("CSR") switches the system mode from the customer mode to the diagnostic mode, the diagnostic mode being switchable between two submodes, namely a "service operator" mode and a "service diagnostic" mode. In the service mode, the CSR can create a print job and process it on the printer to determine any problems that might exist as a result of executing the print job on the printer. In the service diagnostic mode, the CSR can gain further information regarding specific problems by executing one or more diagnostic routines which serve to focus attention on specific problems of the printer. For example, one diagnostics routine might be directed toward finishing diagnostics in which the binding of a set of sheets can be examined. Diagnostic routines are discussed further in the following patents:

U.S. Pat. No. 4,206,995
Patentee: Legg
Issued: Jun. 10, 1980
U.S. Pat. No. 5,202,726
Patentees: McCulley et al.
Issued: Apr. 13, 1993

In one example of operation, a CSR switches the DocuTech printer into the diagnostics mode and opens up the printer, with its attendant image output terminal ("IOT"), to observe various functions of the IOT, such as the above-mentioned binding process. To observe these various functions the CSR may very well reach into the IOT to manipulate one component or another. Reaching into the IOT in this fashion can, however, be quite dangerous if the printer permits a job created in the customer mode to be executed while the CSR is performing diagnostic functions on the printer. In the stand-alone version of the DocuTech printer, the IOT will not start up to execute a customer mode job if the CSR has the printer switched into the diagnostics mode. On the other hand, the network DocuTech printer will permit a customer mode job, received via a network input, to be executed while the CSR is performing diagnostics in the diagnostic mode. It would be desirable to provide a technique that prevents a network printer from executing a customer mode job, received from the network input, while the printer is being operated in the diagnostic mode.

In performing diagnostics on a network printer, it is believed that the network input is typically inactivated. Accordingly, for the typical situation, while the printer is in the diagnostics mode, network jobs are not received at the network input. This inability to receive network jobs during diagnostics is undesirable since network printing system malfunction(s) can occur at the network input. On the other hand, it would be undesirable to consider every incoming network job in the diagnostics mode since the CSR may wish to perform diagnostics on just a selected few of the incoming jobs. To analyze printing system malfunction(s) at the network input, it would be desirable to selectively direct jobs through the network input and/or into the diagnostic mode for diagnosis thereof.

In accordance with one aspect of the presently disclosed invention there is provided a method of performing a service on a job with a printing system in which the printing system is selectively operable in a first system mode and a second system mode, including the steps of: programming the job with instructions for directing the printing system to perform a selected service on the job, said programming step being performed in a selected one of the first system mode and the second mode; providing the job with a job tag for indicating the system mode in which the job was programmed; determining in which system mode the printing system resides; and comparing the job tag with the determined system mode prior to performing the print-related service on the job. In the preferred embodiment of the present invention, the service is performed on the job when the system mode indicated by the job tag is the same as the determined system mode.

In another aspect of the presently disclosed invention there is provided a method of performing a service on a job with a printing system in which the printing system is selectively operable in a first system mode and a second system mode, including the steps of: providing a job database containing a plurality of jobs, each of the jobs in the job database having a job tag for indicating the system mode in which the job was programmed; selecting one of the plurality of jobs to perform a print-related service thereon; determining in which system mode the printing system resides; and comparing the job tag with the determined system mode prior to performing the print-related service on the job. In the preferred embodiment of the present invention, the job is deleted if the job tag is different than the determined system mode.

In yet another aspect of the presently disclosed invention there is provided a method of performing a service on a network job with a selected job name, the network job being transmitted to a printing machine, which is selectively operable in a first system mode and a second system mode, by way of a network input, including the steps of: disposing the printing machine in the second system mode; receiving an indication that a network job with a job name is being transmitted to the printing machine while the printing machine is disposed in the second mode; and determining whether the job name of the job being transmitted to the printing machine corresponds with a selected network job name. In one example of operation, the job being transmitted to the printing machine is designated with the selected job name and the network job is received at the printing machine for performing a diagnostic step.

These and other aspects of the invention will become apparent from the following description, the description being used to illustrate a preferred embodiment of the invention when read in conjunction with the accompanying drawings.

Figure 1:
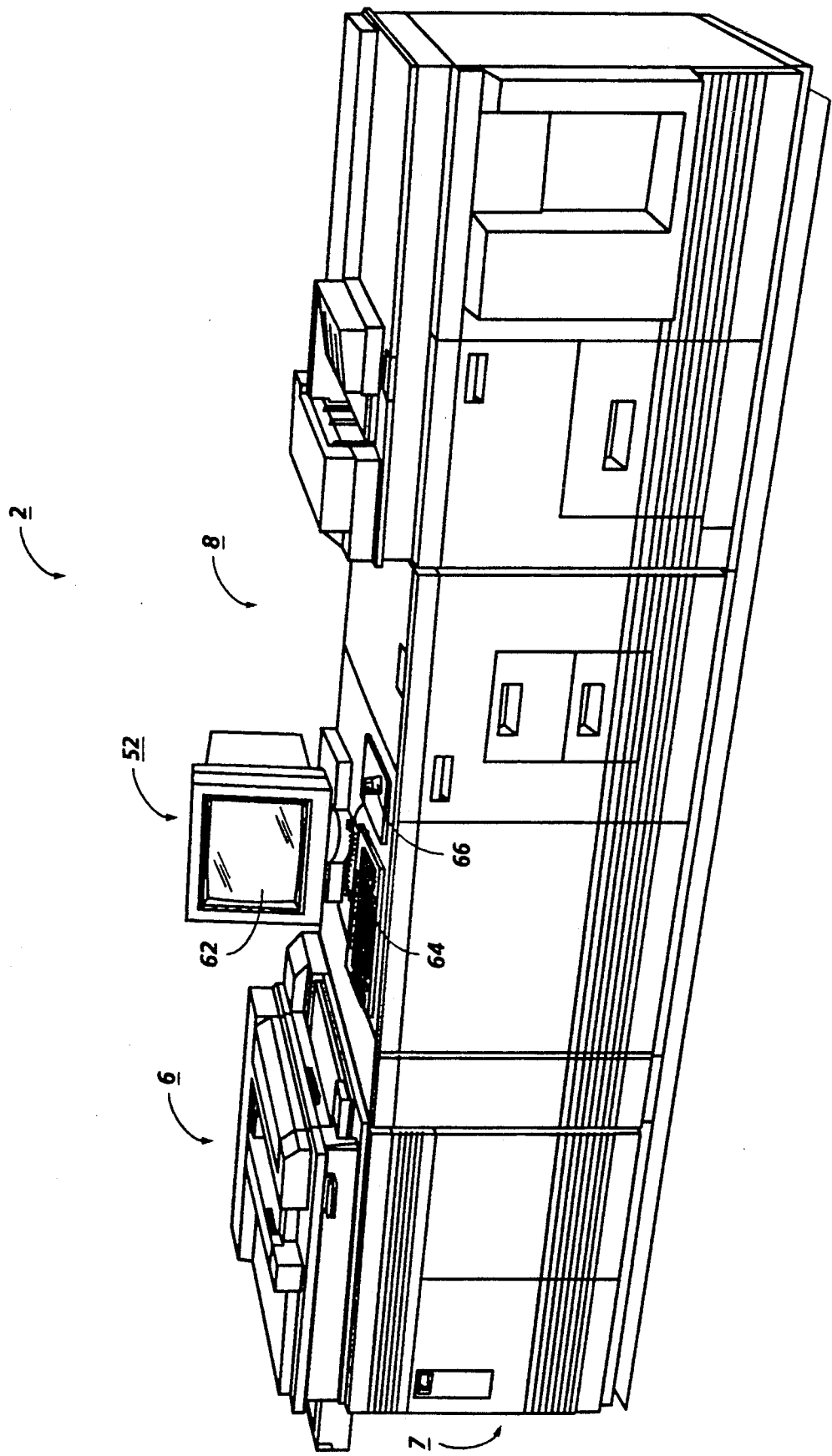
FIG. 1 is a perspective view of an electronic printing system.
Figure 2:
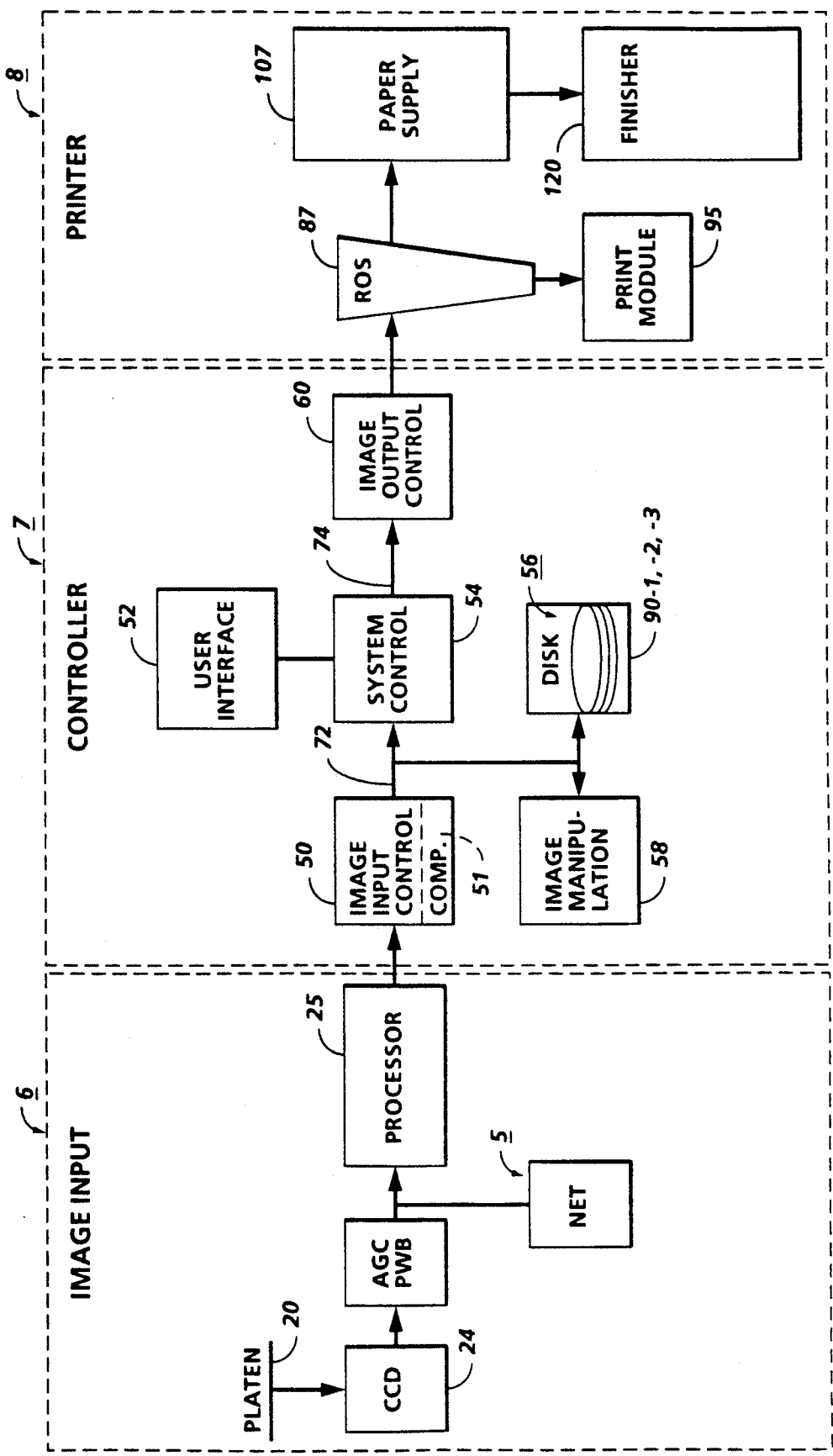
FIG. 2 is a block diagram depicting the major elements of the system of FIG. 1.
Figure 5:
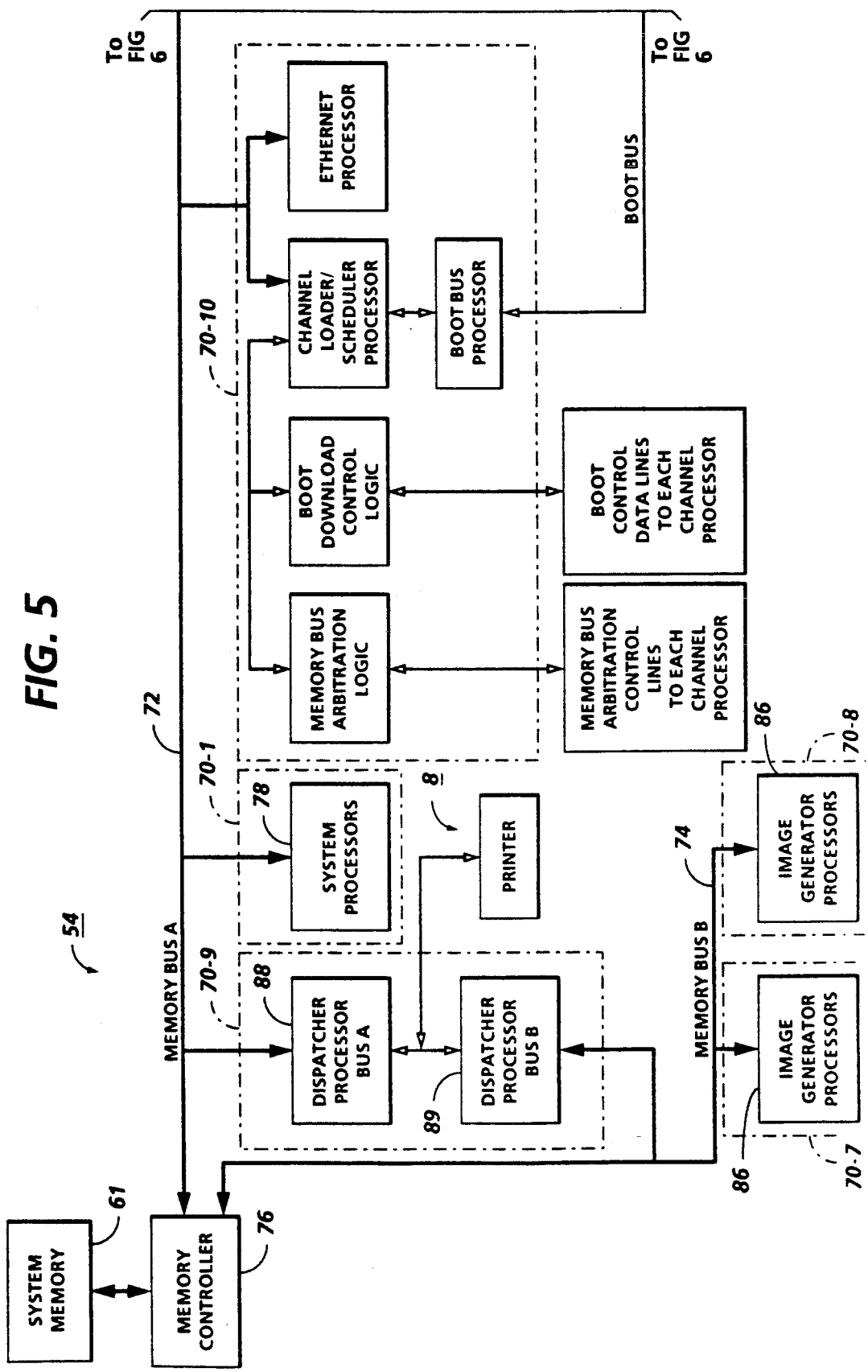
Figure 6:
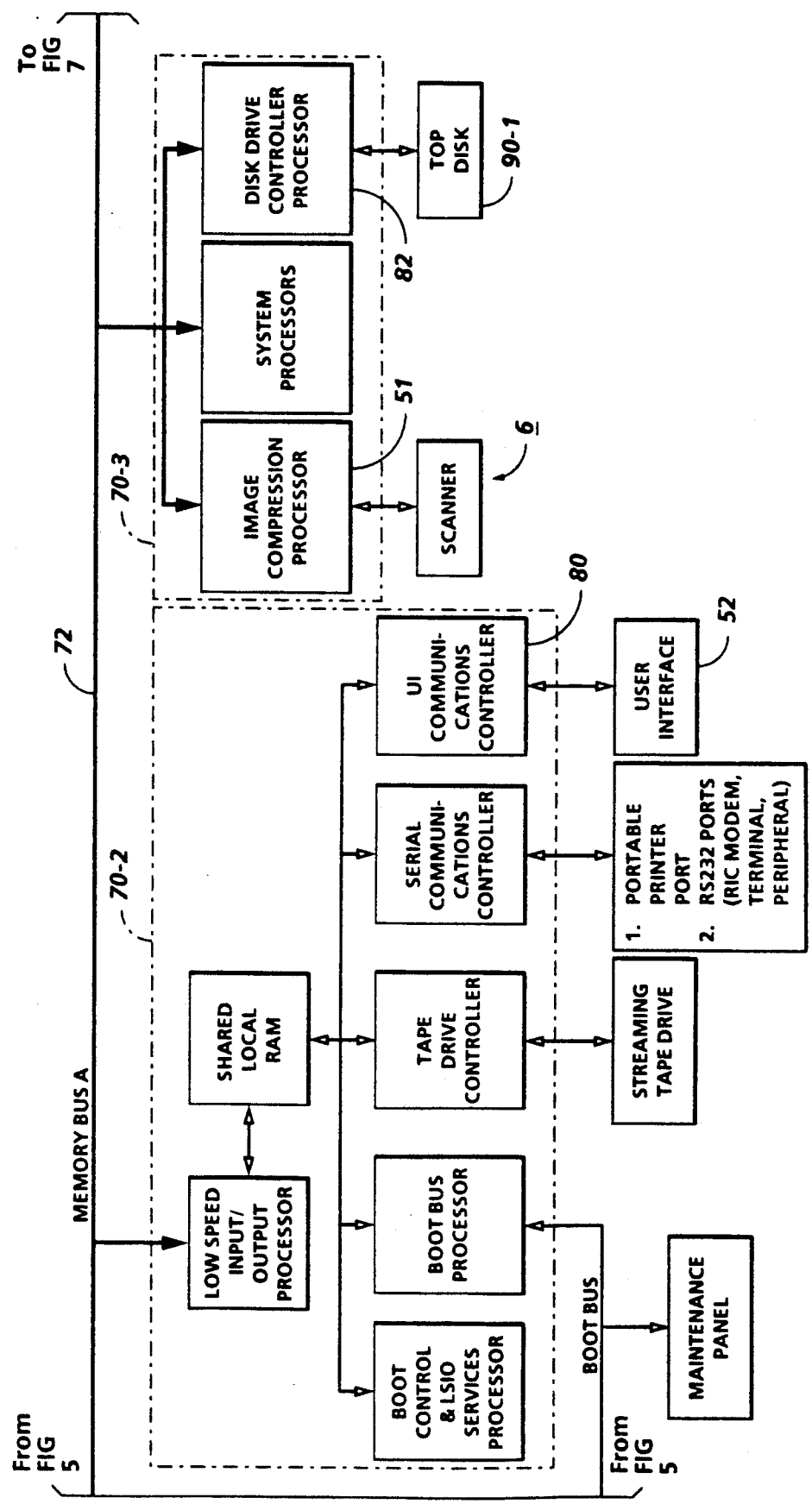
Figure 7:
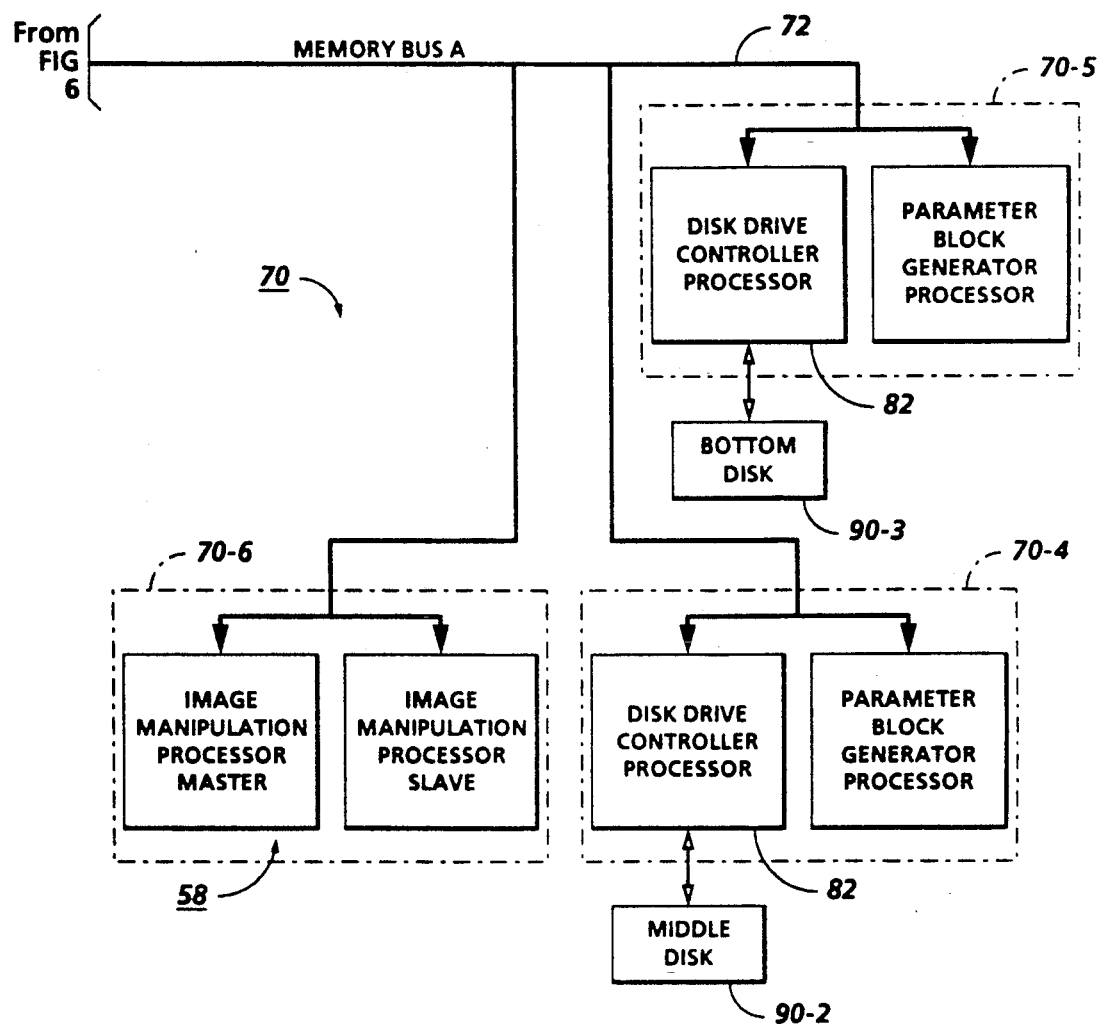
Figure 8:
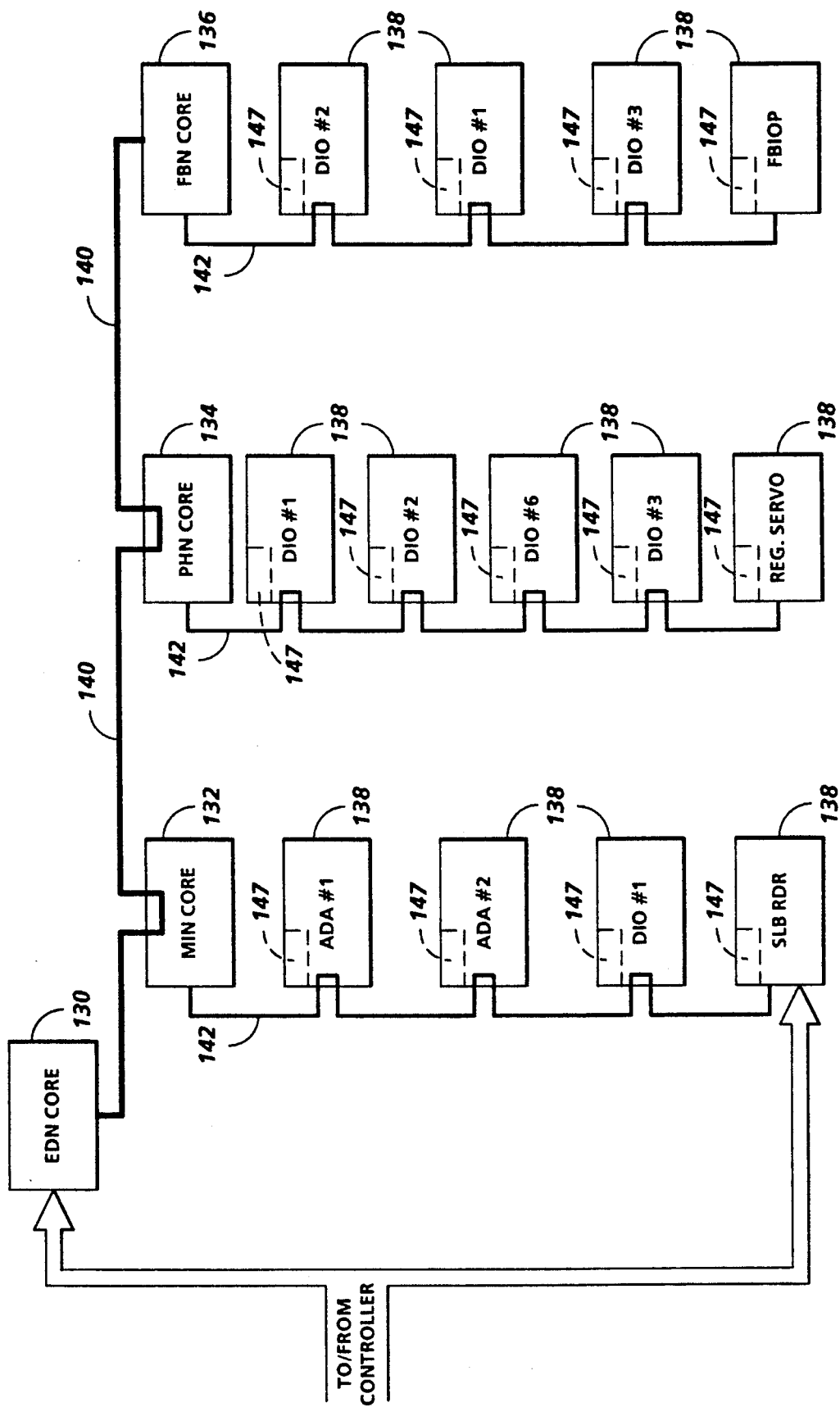
Figure 10:
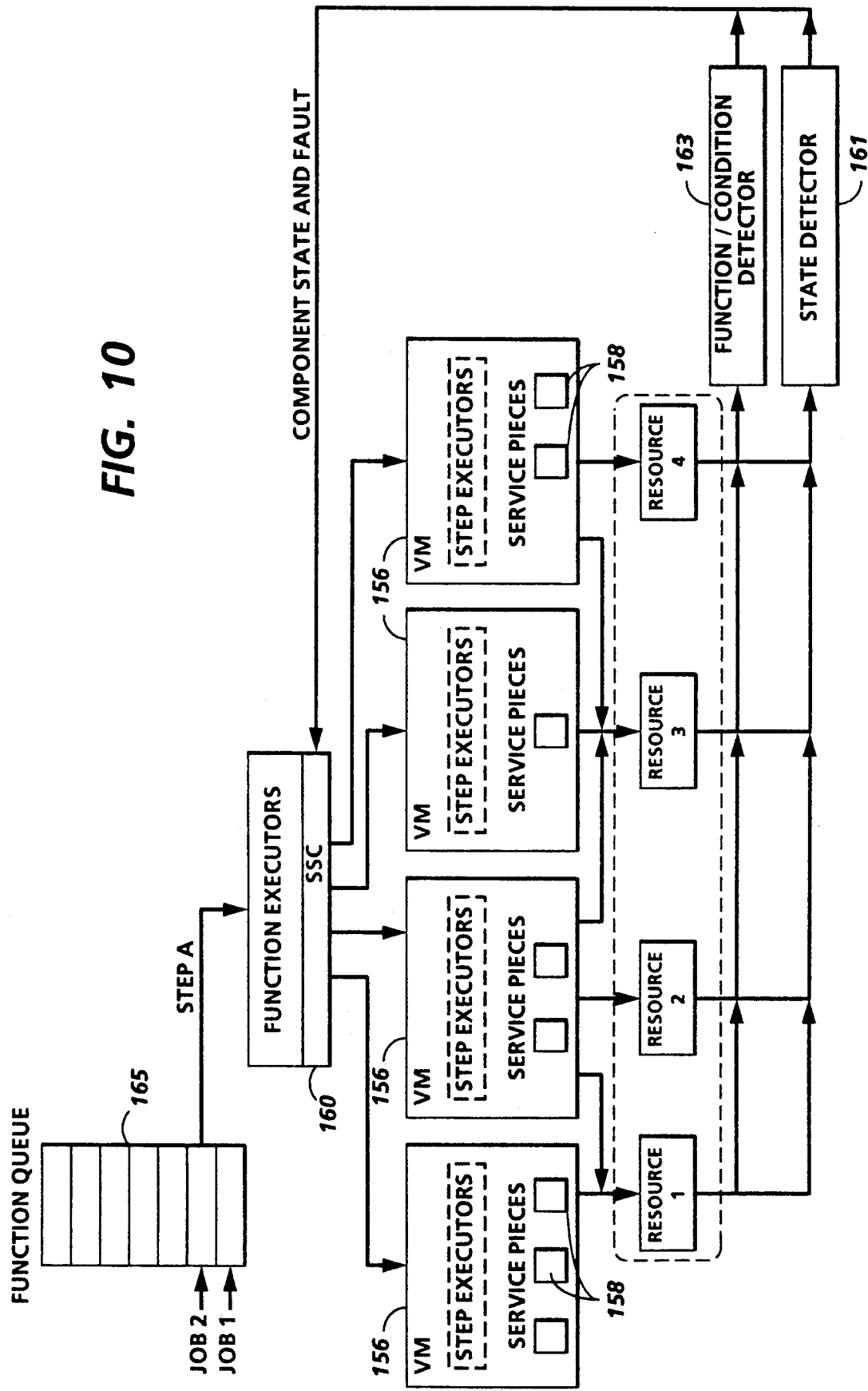
Figure 11:
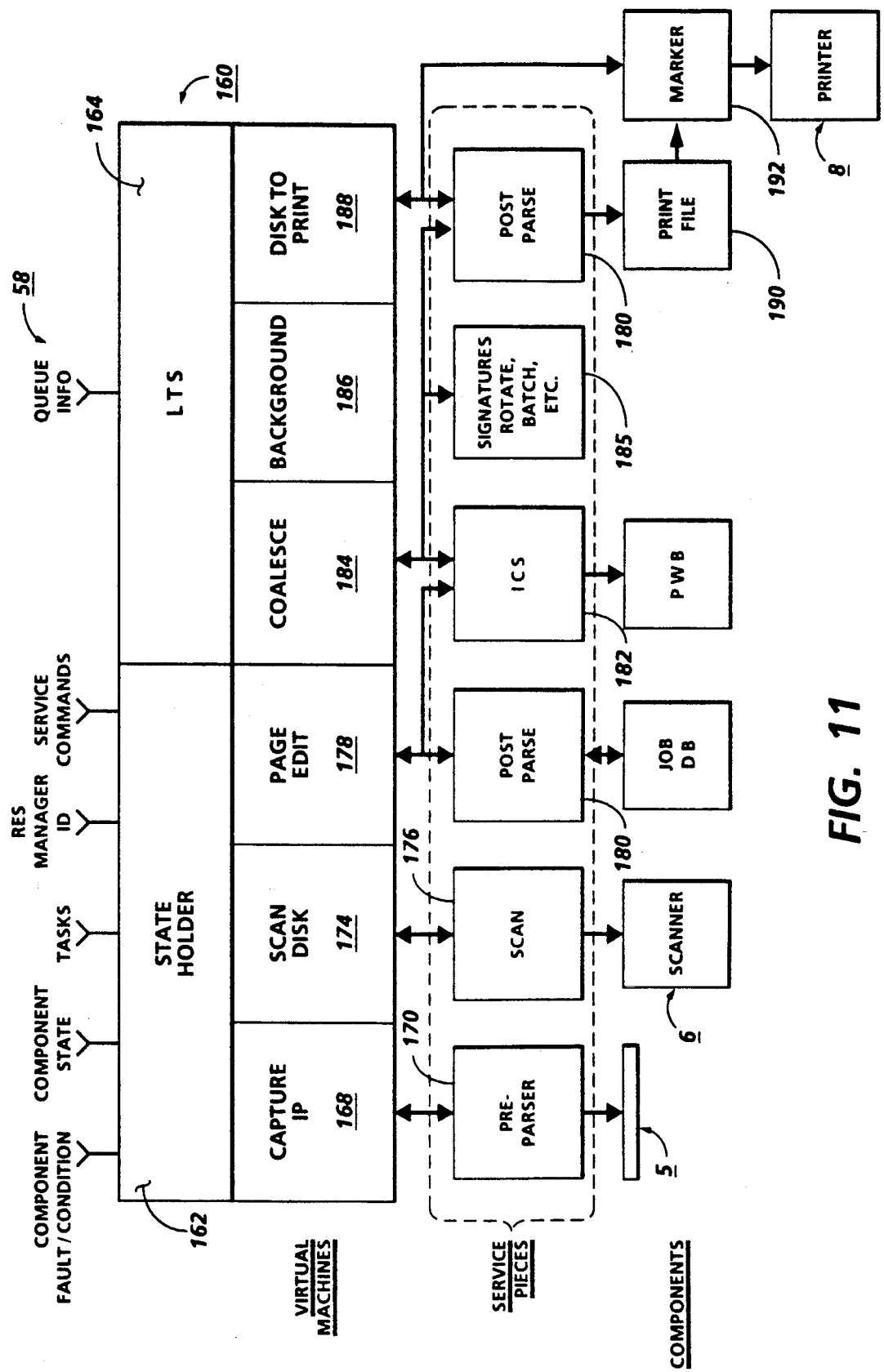
Figure 12:
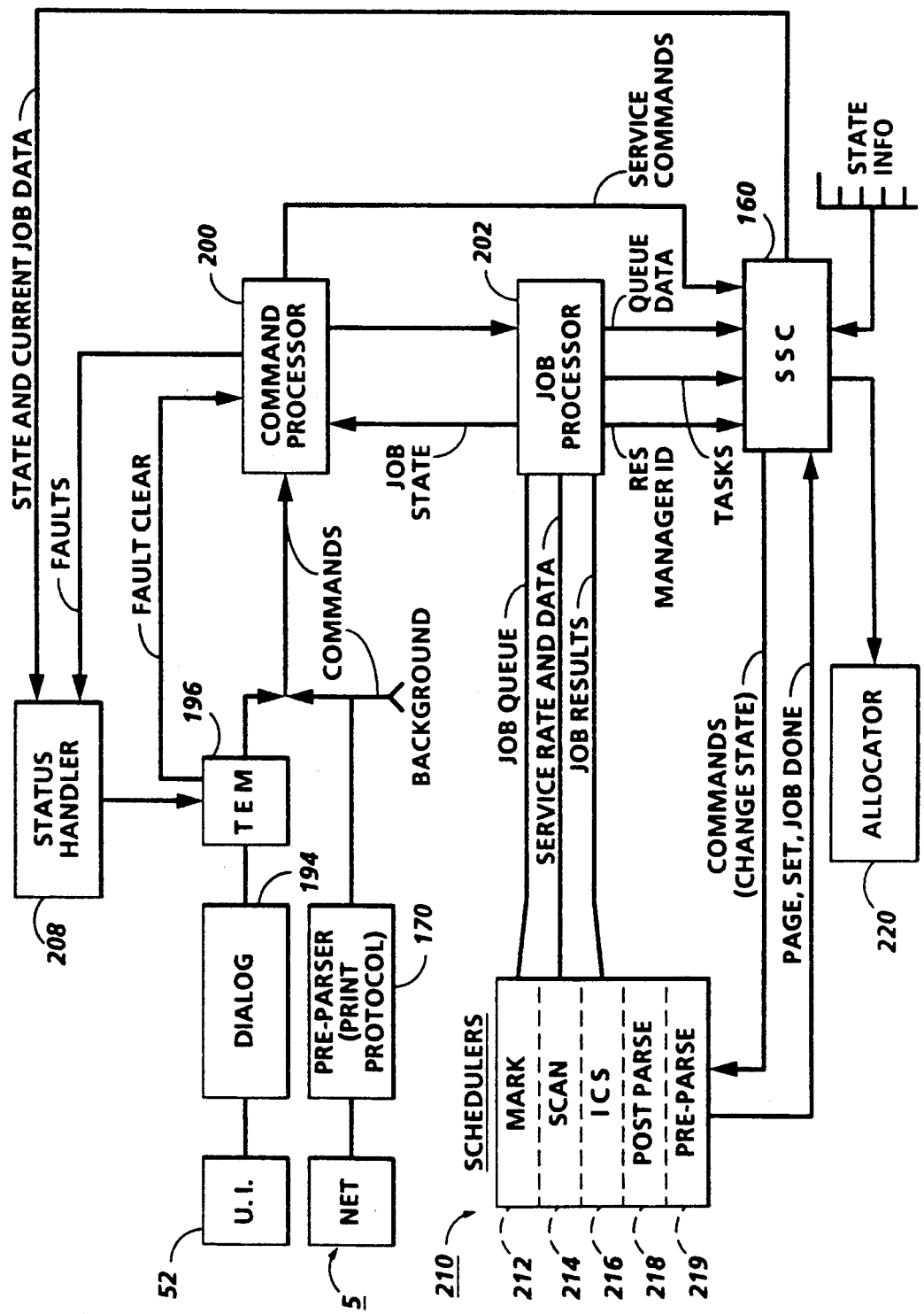
Figure 13:
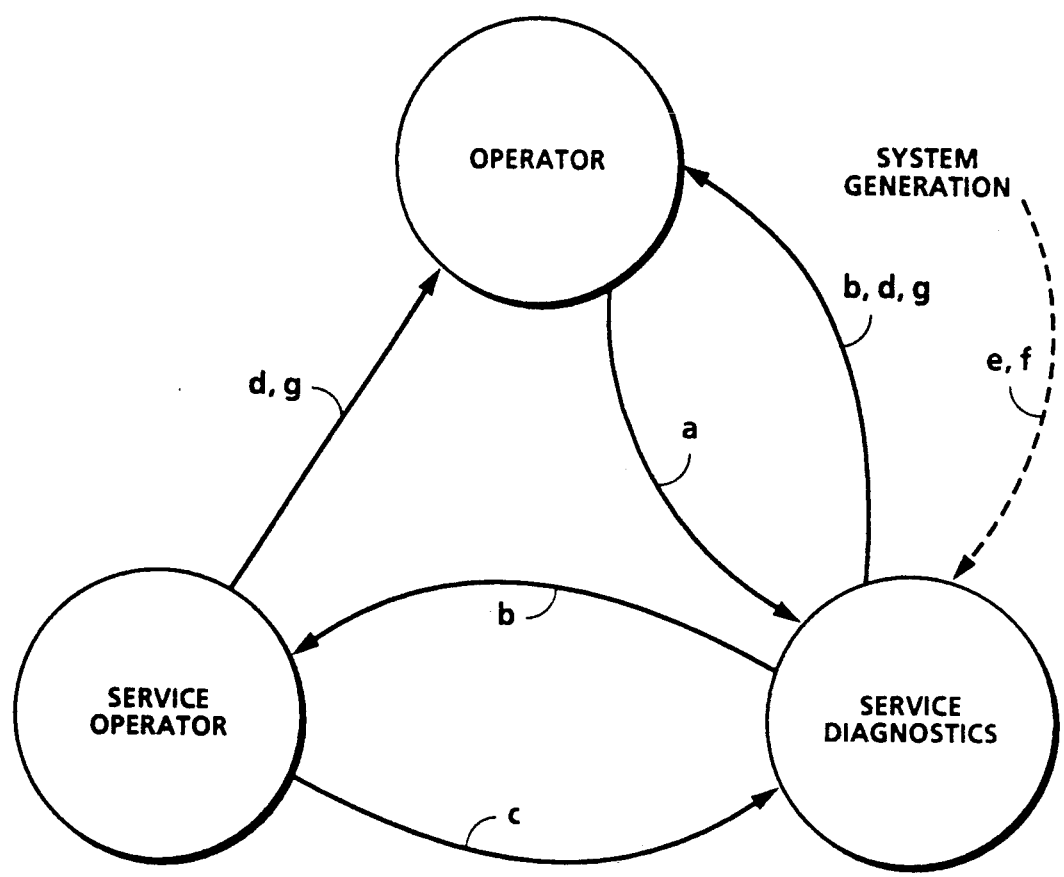
Figure 14:
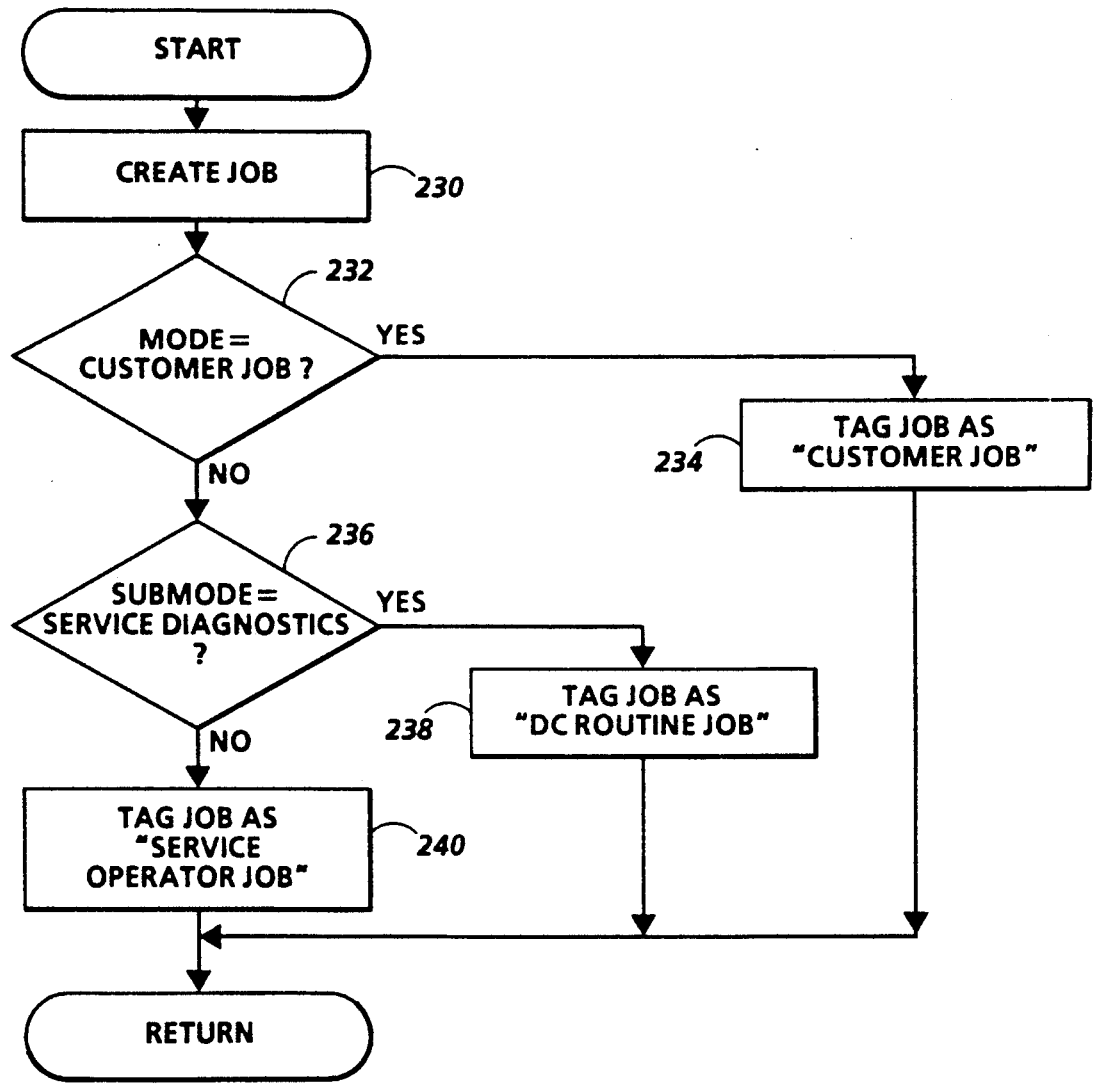
Figure 15:
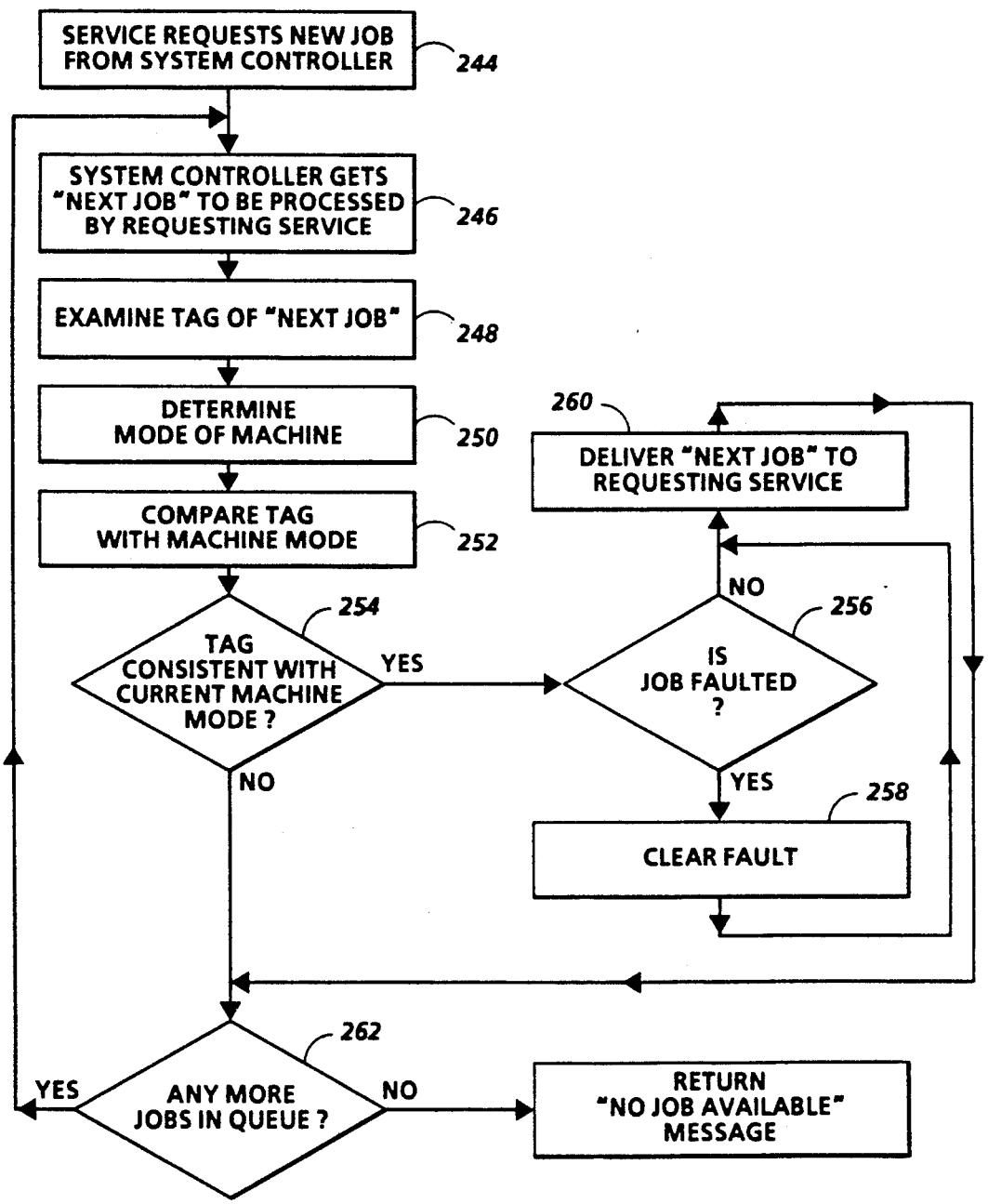
Figure 16:
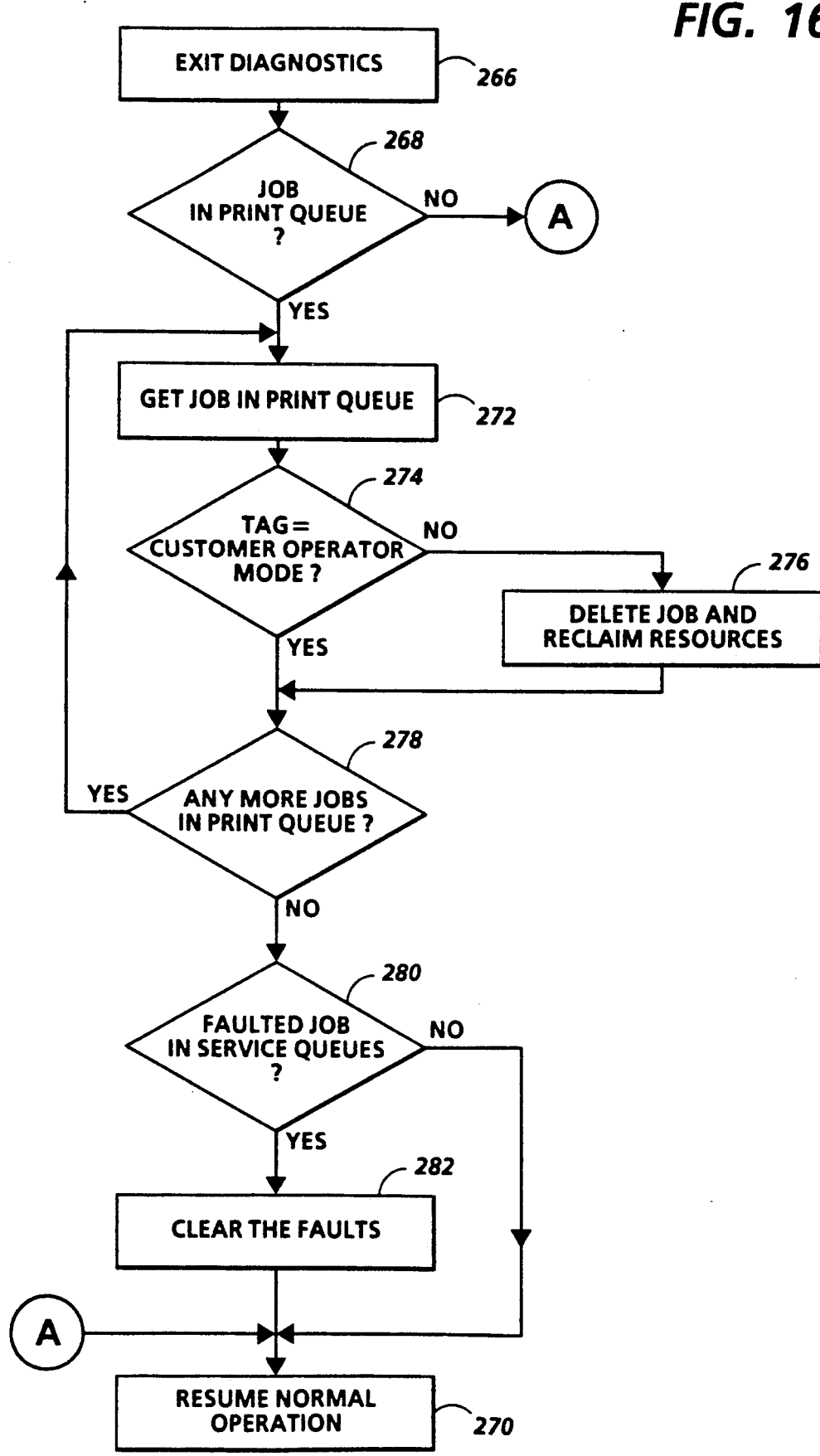
Figure 17:
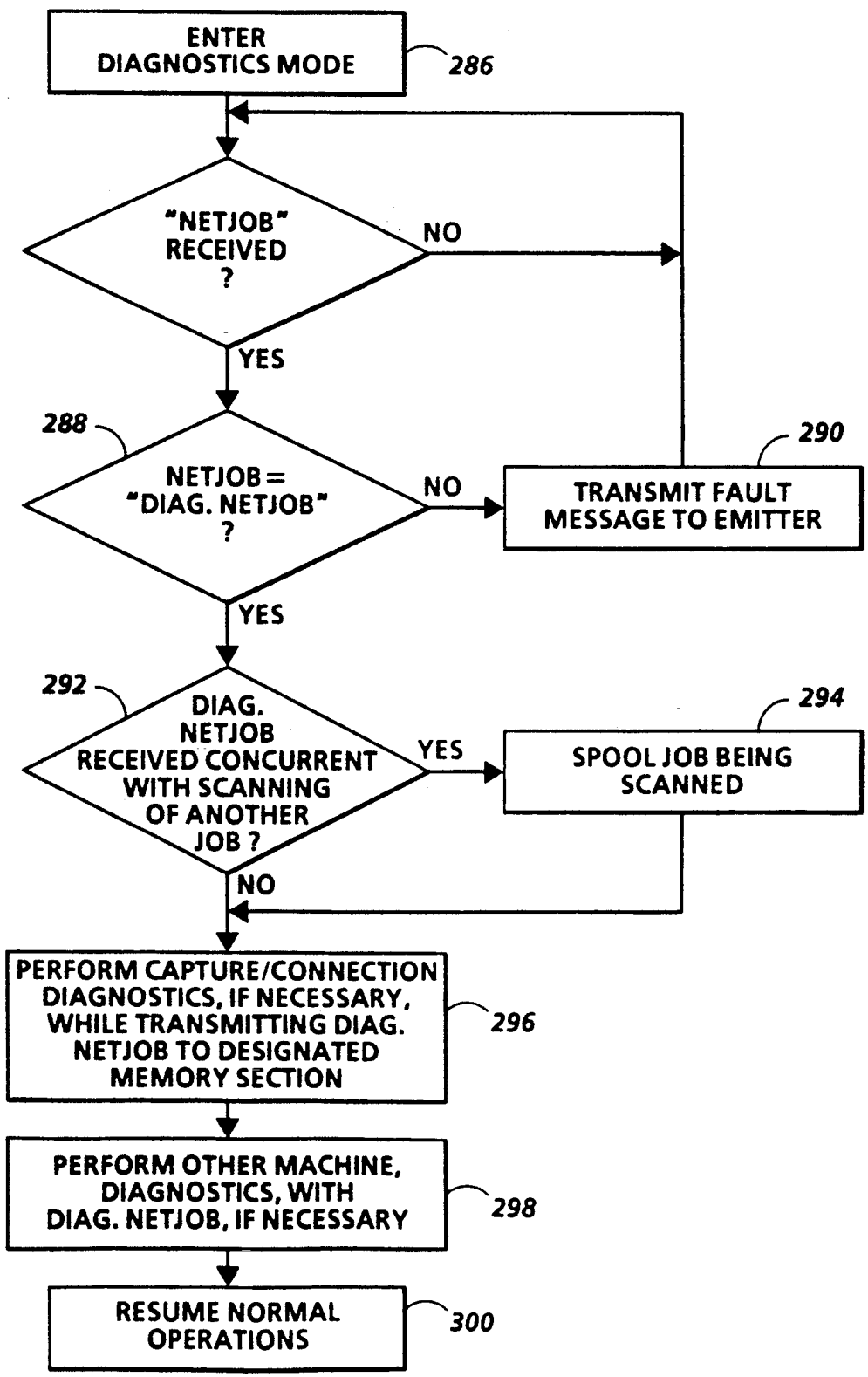

FIG. 5-7 comprise a schematic block diagram of the control section of the system shown in FIG. 2;

FIG. 8 is a block diagram of the operating system, together with printed wiring boards and shared line connections for the system shown in FIG. 2;

Figure 9:
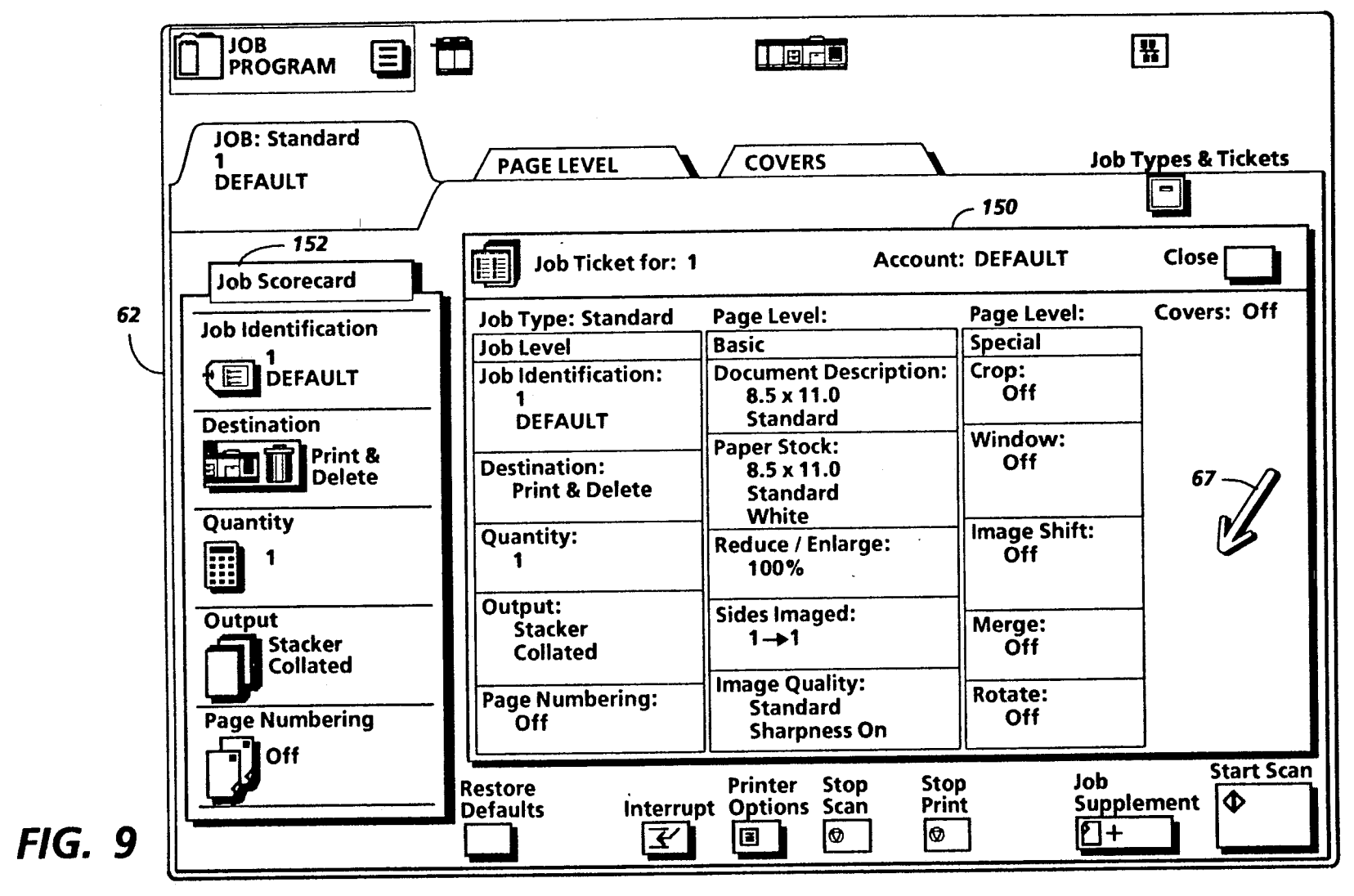

FIG. 9 is an elevational view of an exemplary job programming ticket and job scorecard displayed on the user interface touchscreen of the system shown in FIG. 1;

FIG. 10 is a schematic block diagram depicting a system state controller with virtual machine examples;

FIG. 11 is a schematic block diagram showing details of the system state controller including virtual machine and service examples;

FIG. 12 is a schematic block diagram showing the relationship between the system state controller and other system components;

FIG. 13 is a schematic view of a system mode transition diagram;

FIG. 14 is a flow diagram depicting the manner in which jobs are tagged to designate the mode in which they were programmed;

FIG. 15 is a flow diagram depicting the manner in which job tags are used to prevent jobs programmed in one mode from being executed in another mode;

FIG. 16 is a flow diagram depicting the manner in which system resources are reclaimed upon switching out of a diagnostic mode; and FIG. 17 is a flow diagram depicting the manner in which network jobs are managed by the system when it is switched into the diagnostic mode.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

As used herein, a "Request" is any set of instructions or commands input by an operator, arriving via the network, or generated internally by the system. A Request is issued to:

initiate new processing on a job (e.g. scan & print the job, edit the stored job, etc.)

generally control the system's operation (e.g. stop the printer & any related print processing, shut down all current processing in preparation for power off or switch to diagnostic mode, etc.)

control previously initiated job processing (e.g. abort the job, suspend the job, resume a previously suspended job, etc.)

Each Request which initiates new job processing is asking system 2 to perform some function which is divided into a series of "Virtual Machines" 156 (shown in FIG. 10). A virtual machine is logically a single operation on a job while a set of virtual machines is a plurality of discretely controlled operations for processing jobs. In actual implementation, each Virtual Machine 156 requires various system "Services" or Service Pieces 158 to carry out its operation. Each Service Piece 158 provides a specific low level system function. The same Service Piece may be used by multiple transactions as part of a higher level logical operation. In providing its specific function, each Service Piece uses basic system "Components" or physical resources such as hardware modules, software modules, or system resources (memory, disk, etc). The same Components may be used by multiple Service Pieces.

Individual Virtual Machines are identified by a "TransactionId". Individual Service Pieces are identified by a "Serviceld". When a particular Service Piece 158 is working on behalf of a specific Virtual Machine 156, it identifies itself by a "ResManager ID" which consists of a Transactionld, Serviceld pair. Resource (Res) Manager defines resource mapping that provides resources to clients on demand.

Referring to FIGS. 1 and 2, there is shown an exemplary system 2 supporting the processing of Requests in accordance with the teachings of the present invention. As will appear, system 2 has a plurality of independent functions (such as scan, print, etc.) which operate asynchronously, with operation being implemented by a shared set of Service Pieces and components. The exemplary system 2 shown for purposes of explanation provides network, scan, make ready, and print functions with both remote and on-site inputs in the form of network 5 and scanner 6, controller 7, and printer 8. Inputs to scanner are images, whereas inputs from network 5 are PDL (page description language) formats such as Interpress, Postscript, or HP PCL. To enable system 2 to be tailored to the specific needs of different customers and provide different functions to different customers, other configurations may be envisioned such as a stand alone printing system composed of scanner, controller, and printer 6, 7, 8 respectively, a network printer composed of network 5, controller 7, and printer 8 respectively, etc.

In system 2, components such as memory are shared by different Service Pieces running concurrently on behalf of various Virtual Machines which have been initiated in order to meet the current set of new job processing Requests. As a result, it is necessary, when these components become scarce or unavailable as, for example, due to a fault, overload, etc. to re-prioritize the Virtual Machines. This may lead to shutdown of one or more Virtual Machines even though all the Service Pieces needed by that Virtual Machine are ready and able to perform. These same Service Pieces will continue to be available for Virtual Machines other than the Virtual Machine or Machines shut down.

In order to provide a balance between the Virtual Machines, allow interaction in a controlled and efficient manner and provide prioritization of response to Requests, the present invention is provided.

Figure 3:
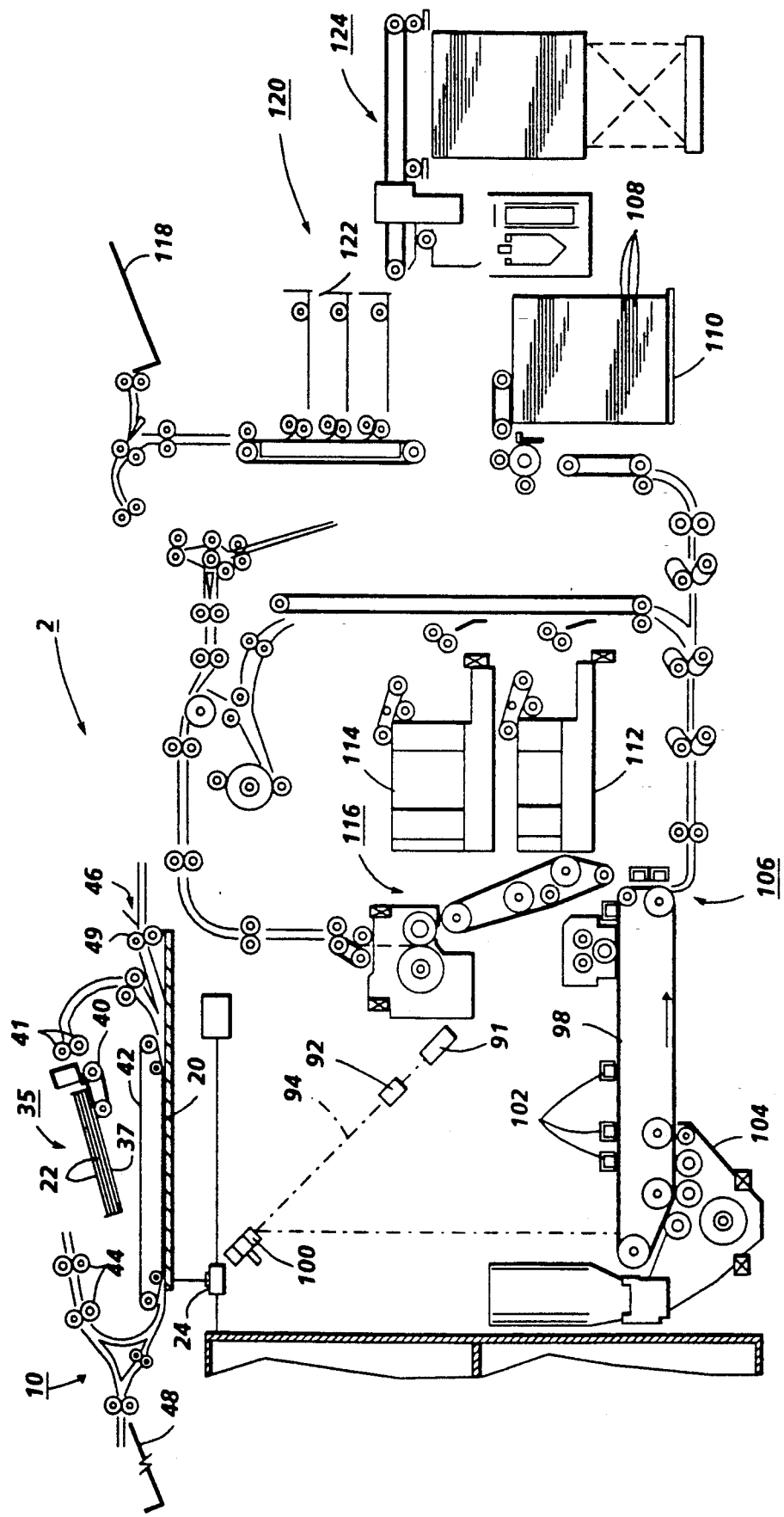
FIG. 3 is an elevational, schematic view illustrating various components of the system of FIG. 2.
Figure 4:
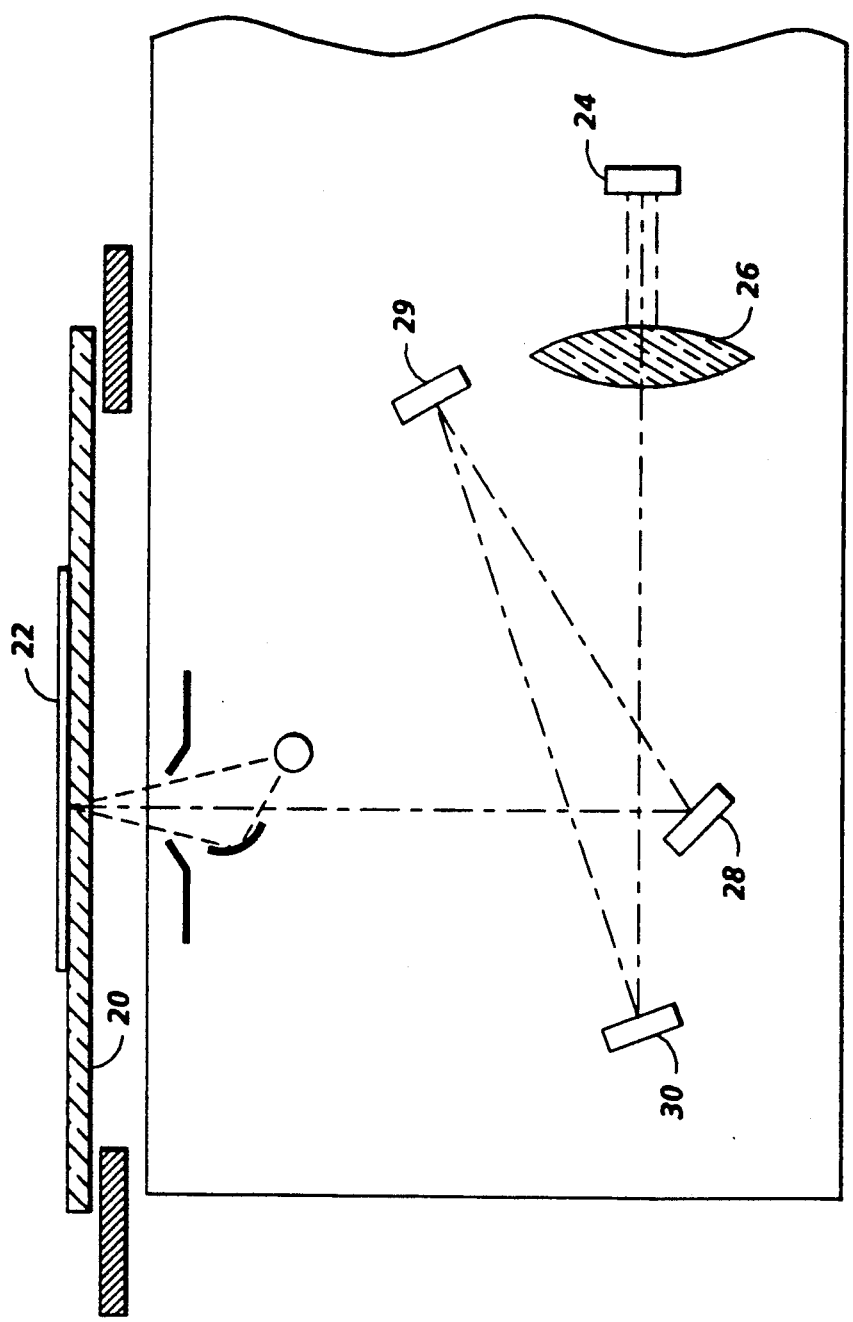
FIG. 4 is a schematic view showing certain construction details of the document scanner of the system of FIG. 1.

Referring particularly to FIGS. 2-4, network 5 comprises any suitable communication channel such as a telephone line for enabling data from one or more remote sources to be input to system 2 for processing.

Scanner 6 incorporates a transparent platen 20 on which the document 22 to be scanned is located. One or more linear arrays 24 are supported for reciprocating scanning movement below platen 20. Lens 26 and mirrors 28, 29, 30 cooperate to focus array 24 on a line like segment of platen 20 and the document being scanned thereon. Array 24 provides image signals or pixels representative of the image scanned which after suitable processing by processor 25, are output to controller 7.

Processor 25 converts the analog image signals output by array 24 to digital and processes the image data from network 5 and scanner 6 as required to enable system 2 to store and handle the image data in the form required to carry out the job programmed. For image data input by scanner 6, processor 25 also provides enhancements and changes to the image signals such as filtering, thresholding, screening, cropping, reduction/enlarging, etc. Following any changes and adjustments in the job program, the document must be re-scanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer 8 comprises a laser type printer and for purposes of explanation is separated into a Raster Output Scanner (ROS) section 87, Print Module Section 95, Paper Supply section 107, and Finisher 120. ROS 95 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 1, 2 and 5-7, controller 7 is, for explanation purposes, divided into an image input controller 50, User Interface (UI) 52, system controller 54, main memory 56, image manipulation section 58, and image output controller 60.

Image data input to controller 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different Requests, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program Requests and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5). Following this, the data is output by dispatch processors 88, 89 on PWB 70-9 to printer 8. Image data sent to printer 8 for printing is normally purged from memory 56 to make room for new image data.

Referring particularly to FIGS. 5-7, controller 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer 8; dispatch processor PWB 70-9 having dispatch processors 88, 89 for controlling transmission of data to and from printer 8; and boot control-arbitration-scheduler PWB 70-10.

Referring particularly to FIG. 8, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Referring to FIG. 9, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job.

Referring to FIGS. 10-12, image manipulation processor 58 includes a System State Controller (SSC) 160 which serves as a function executor for controlling and prioritizing operation of the various Virtual Machines in response to Job Processing Requests. SSC 160 receives Job Processing Requests from function queue 165 and converts the Request into a series of discrete Virtual Machines 156 with the Service Pieces 158 needed to carry out the job programmed.

SSC 160 includes a state holder 162 which maintains a running log of the state of the various Virtual Machines and Service Pieces that comprise system 2. The operating state and fault/condition of the Service Pieces and their components are monitored by a suitable state detector 161 and fault/condition detector 163 which continuously feed back updated service and component condition data to SSC state holder 162. SSC 160 also includes Long Term Scheduler (LTS) 164 which sets priorities for the Virtual Machines required when processing jobs.

In the example shown in FIG. 11, Virtual Machine, Service Piece and Job Processing Request mappings are as follows:

Capture Inter-Press (IP) 168 comprised of pre-parser service 170 and Image Conversion Service (ICS) 182—enables input of PDL data to system 2 from network 5;

Scan-To-Disk 174 comprised of scan service 176—enables input of image data from scanner 6;

Page Edit 178 comprised of post parse service 180 and (ICS) 182—enables a local operator to view and alter portions of a job;

Coalesce 184 comprised of ICS service 182, post parse service 180 and other services such as rotate 185 enables the preparation of a job for printing;

Background 186 enables housekeeping functions that go on anytime system 2 is up and running;

Disk-To-Print 188 comprised of post parse service 180, print file 190 and mark service 192 enables the transfer of electronic input data on disk to images on paper provided by printer 8.

Other Virtual Machines and service combinations may be envisioned.

Referring still to FIG. 11, incoming jobs are created in a job database (designated as "JOB DB"), the JOB DB holding the various jobs of the printing system to be processed. Preferably, the JOB DB is accessible to each of the service pieces for delivering a job to one of the services pursuant to receiving a suitable request from one of the service pieces. As shown in U.S. Pat. No. 5,164,842 to Gauronski et al., the pertinent portions of which are incorporated herein, the jobs of the JOB DB can be arranged in one of a system queue (job file) and a print queue.

Referring particularly to FIG. 12, operator instructions or commands input via UI 52 are accepted by dialog 194. The dialog is thereafter converted by Trillium Emulator (TEM) 196 into the internal language (i.e. Mesa) used by system 2. Commands and PDL data received via network 5 are converted by pre-parser service 170 to the internal format used by system 2. It is understood that image data input via scanner 6 does not require pre-parsing. Other data includes background data that is generated whenever system 2 is running, since certain background operations take place to maintain the system in an operating condition.

A command processor 200 converts the commands into a set of job processor and SSC commands which are forwarded to job processor 202 and to SSC 160. Command processor 200 also enables recovery of faulted objects (i.e., jobs) and provides a faulted job count ("faults") by queue for display by status handler 208.

Job processor 202 maintains a database of jobs in system 2 and function queues. Processor 202 also manages the data manipulation required for running jobs in the system and provides job state information ("Job state") to command processor 200. Processor 202 provides SSC 160 with tasks (steps) that have passed all job requirements for a particular service, and passes an identifier (i.e., Res Manager ID) for tasks that are ready to be processed to SSC. Processor 202 also informs SSC when a high priority task for service is available thus managing task priorities. Processor 202 receives job processing results ("Job results") from schedulers 210 and uses this data to build and checkpoint jobs. Processor 202 also receives service rates and data ("Service Rates & Data") from schedulers 210 to determine when a task should be made available, and job queue information ("Job Queue") for input ("Queue data") to SSC 160 so that the SSC can make intelligent resource tradeoffs.

Schedulers 210 ("Step Executors") include mark scheduler 212, scan scheduler 214, ICS scheduler 216, post-parse scheduler 218, and pre-parse scheduler 219 for scheduling tasks carried out by mark, scan, ICS, post parse, and pre-parse services 192, 176, 182, 180, 170 respectively in accordance with commands from SSC 160. Schedulers 210 perform processing of a task for the Service associated with the task, checking parameters, updating task state, and adding pages to a job. Schedulers 210 track their own faults, and provide means for SSC 160 to control component usage (i.e., stop, abort, resume, power off, initialize, etc). Schedulers 210 also provide page, set, and job done data to SSC 160, implement interrupts at the page and set boundaries, and implement resume.

SSC 160 is an example of a "Function Executor" SSC 160 understands what needs to be done to or with portions of system 2 to accomplish a Request. SSC 160 accepts service commands ("Service Commands") with task identifier (i.e., Res Manager ID) from job processor 202 and decides, based on current system operating data (i.e., fault, resource, state) if a service for a Virtual Machine is ready to accept a command. SSC 160 calls schedulers 210 to change state ("change state") by executing commands. SSC 160 also implements interrupts at the job level and resumes, and accepts higher priority tasks from job processor 202. SSC 160 receives data about state changes from different parts of the system to maintain a current view of the system state. SSC 160 also coordinates the interactions between multiple services, and provides service states, faults, and current job information to status handler 208 for display on touchscreen 62 of UI 52.

SSC 160 enables and tracks clearance and recovery from faults. The clearance can be an acknowledgement from the local operator via a selection on touchscreen 62 of UI 52 and passed through TEM 196 or a sensing from within the system that all actions have been taken to clear the fault. SSC 160 also handles system resource problems by changing resource component priorities using allocator 220. For this, LTS 164 of SSC 160 uses data from schedulers 210 ("Page, Set, Job Done") and queue data (i.e., run lengths, etc.) from job processor 202 to make intelligent resource tradeoffs, using commands to appropriate service schedulers 210 to suspend or shutdown when their resource components are needed elsewhere.

When a job enters system 2, Command Processor 200 updates job Processor 202 with all the required job data. The job processor 202 informs SSC 160 when the job requires a particular service and waits for the appropriate scheduler 210 to retrieve the job for its service. If the service completes its task with no faults, the scheduler 210 updates the job processor 202 and then advances the job to the next service. If, however, the service has a fault while performing its task, the scheduler 210 will inform SSC 160 which will provide the state, fault, and current job information to status handler 208 for display on touchscreen 62 of UI 52. If the fault is clearable, the service will resume its task upon clearance and recovery of the fault.

During a job, when a service working on behalf of a Virtual Machine requires more memory than is currently assigned to it by LTS 164, the service messages LTS 164. LTS 164 endeavors to find the additional memory with the least impact on system operation as, for example, by shifting available memory within a Virtual Machine from services not currently required and allocating the memory to the service making the request. Where the amount of memory obtained is insufficient within the Virtual Machine, LTS 164 shutdowns other Virtual Machines in accordance with a determined priority until the needed memory is obtained. In the example shown, Disk-To-Print Virtual Machine 188 has the highest priority, Page Edit 178 second priority, etc. Other or different priorities may, however, be envisioned.

Background Virtual Machine 186 which go on all the time are normally excluded from the pool of Virtual Machines from which LTS 164 can obtain memory.

SSC 160 also accepts Requests from the user or from within the system 2 that are not related to initiating Job Processing. These Requests either modify the system's operation or modify a job's processing that was previously initiated. In the former case, for example, the operator can request to power off system 2. If system 2 is processing jobs, SSC 160 will either abort all services running jobs or allow the services to complete the current jobs but prevent new jobs from starting. This decision is made by the operator. Once system 2 is quiesced, SSC 160 will initiate the power off. In the latter case, for example, the operator can request printer 8 to suspend and wait for further commands. SSC 160 will log the source of the request and command the service to suspend. When the operator provides its next request (i.e., abort or resume), SSC 160 will check the states for that service and Virtual Machine and will initiate the request if the states permit it.

With multiple sources for state changing Requests, SSC 160 could receive conflicting Requests. To prevent system 2 from processing Requests in an illogical order, SSC 160 logs the origin of each Request and understands what is needed before resuming each service. For example, the mark service 192 can run out of data to print and inform SSC 160 of the problem. SSC 160 notes the problem and waits for Job Processor 202 to inform SSC 160 that enough data has accumulated for the mark service 192 to resume. At the same time mark service 192 suspends itself, the operator can request printer 8 to stop. SSC 160 will also log the Request from the operator. SSC 160 will not resume mark service 192 until both Job Processor 202 and the operator have provided their approval for resumption.

Where LTS 164 senses that the performance of system 2 is degraded (i.e., at reduced speed) due to concurrency, the SSC may respond by temporarily shutting down some Virtual Machines in favor of others to allow an expedient completion of certain Requests.

Referring to FIG. 13, a system mode transition diagram of the printing system 2 is shown. Preferably, normal operation resides in the "operator" or "customer" mode, and diagnostics-related operation resides in the diagnostics mode, the diagnostics mode comprising two submodes, namely the "service operator" mode and the "service diagnostics" mode. As indicated above, jobs can be developed for diagnosing the printing system through use of the service operator mode and diagnostic routines can be executed from the service diagnostics mode. Switching among the modes is monitored by a system manager, the system manager including the system state controller 160 (FIG. 11) and the virtual machines. Referring to the letters a-f in FIG. 13, the system manager performs the following actions when switching between system modes:

a. When switching from operator mode to service diagnostics mode, all customer jobs running in a service are faulted;
b. A switch from service diagnostics preferably occurs after all diagnostic routine jobs have completed processing;
c. When switching from service operator mode to service diagnostics mode, all diagnostics jobs in the print queue are deleted;
d. When switching from service diagnostics mode or service operator mode to operator mode, all diagnostics jobs in the print queue are deleted;
e. On system generation (i.e., system boot-up), all diagnostic routine jobs are deleted;
f. On system generation into service diagnostics mode, the image output terminal ("IOT") is faulted and taken off line; and
g. When switching from service diagnostics mode or service operator mode to operator mode, the IOT is faulted and taken off line.

In one example of operation, a customer service representative ("CSR") may seek to keep the IOT online while s/he is performing various diagnostic operations on the printing system. Under these circumstances, the CSR desires that the operation of jobs created in modes other than the one s/he is in be inhibited. Referring to FIGS. 14 and 15, an improved technique for insuring that jobs programmed in one mode can only be executed in that mode, is shown. Referring specifically to FIG. 14, an exemplary routine is shown for "tagging" a job as it is programmed. In particular, at step 230, a job is created. It should be recognized that parts, or all, of the job could be created remotely of the printing system 2. In practice, the job is provided with a tag to indicate whether it is intended to be performed in the customer mode or one of the diagnostic submodes. If the job is determined to have been created in the customer mode, then it is tagged accordingly by the system manager and the system is returned from the tagging routine (steps 232 and 234). If the job is determined to have been created in the service diagnostics submode, then it is tagged accordingly by the system manager and the system is returned from the tagging routine (steps 236 and 238). If the answers to decision blocks 232 and 236 are both NO, then the job is tagged accordingly by the system manager (step 240) and the system is returned from the tagging routine.

Referring specifically to FIG. 15, the manner in which the job tags are employed is shown. Initially, at step 244, one of the services (FIG. 11) requests a new job from the system manager, and, at step 246, the system manager gets the next job to be processed by the requesting service. After examining the tag of the next job (step 248), the system manager determines the mode of the system (step 250) and compares the tag with the determined mode (step 252). As discussed above, with respect to the discussion of FIG. 13, when the system is switched from the customer mode to the diagnostics mode, all jobs running in a service are faulted. In one example of operation, the system would return from the diagnostics mode to the customer mode and encounter faulted jobs. Accordingly, if the answer to a decision at 254 is YES, then a check is performed, at step 256, to see if the job requested by the service is faulted. If necessary, a fault is cleared (step 258) and the next job is delivered to the requesting service (step 260). When the tag of the next job does not match the current machine mode (see step 254), then the process either proceeds to examine the jobs of the job database, if the answer to decision block 262 is YES, or returns a "NO JOB AVAILABLE" message, if the answer to decision block 262 is NO.

After a CSR has exited diagnostics, s/he may leave various jobs in the job database (FIG. 11), or, more specifically, an attendant print queue. This is undesirable since the jobs typically will not be used again and they serve to deplete the resources of the printing system 2. Referring to FIG. 16, a routine for reclaiming resources is shown. Initially, at step 266, the CSR exits diagnostics, and it is determined, at step 268, whether a job is in the print queue. If no job resides in the print queue, then the process proceeds to step 270 at which normal system operation is resumed. If one or more jobs reside in the print queue, then a job is retrieved from the print queue (step 272) and the tag of the job is examined (step 274). If the job was developed in the diagnostics mode, then, per step 276, the job is deleted; otherwise, the process determines whether any more jobs reside in the print queue (step 278). If the answer to decision block 274 is YES, then the subroutine, defined by steps 272, 274, 278 and, optionally, 276, is repeated until there are no more jobs in the print queue. Once the jobs in the print queue have been depleted, a subroutine defined by steps 280 and 282 is used to clear any faulted job(s) residing in the service queue(s).

As mentioned above, the system 2 can assume the form of a network printer. Referring to FIG. 17, a routine for performing diagnostics on a network job is shown. To perform diagnostics on a network print job, the CSR initially enters the diagnostics mode (step 286). Upon receiving a network job (referred to as "NETJOB"), the process determines, via step 288, whether the NETJOB possesses a selected name (the name being referred to as "DIAG.NETJOB" in FIG. 17). If the NETJOB does not possess the selected name, then a fault message is sent to the emitter of the received NETJOB (step 290) indicating that the printing system cannot, at the present moment, process customer jobs. Assuming NETJOB=DIAG.NETJOB, any jobs being processed at scanner 6 are, by way of steps 292 and 294, spooled to one of disks 90-1, 90-2 or 90-3 (FIG. 2). It will be appreciated by those skilled in the art that all incoming network jobs could, in a contemplated embodiment, be spooled to the disks, rather than being faulted as described above. As the DIAG.NETJOB is received (step 296) appropriate diagnostics can be performed, if necessary, to examine any capture/connection difficulties which might exist at the network input. Preferably, the DIAG.NETJOB is transmitted to the disks for subsequent retrieval. By doing this the CSR is insured that the IOT will not start up unexpectedly. After any necessary diagnostics are performed with the DIAG.NETJOB (step 298), normal operations of the system are resumed (step 300).

Numerous features of the above-disclosed embodiment will be appreciated by those skilled in the art:

One feature of the disclosed embodiment is that it discloses an improved method which prevents a job programmed in one system mode from being executed in another system mode. That is, preferably, each job is "tagged" by a system manager for subsequently determining whether the tag is consistent with the current system mode. If, pursuant to executing the job, it is found that the tag is inconsistent with the current system mode, then the job is executed at a later time. This is particularly useful when a customer service representative is performing diagnostics with the image output terminal and the system attempts to execute a network job in a customer mode.

Another feature of the disclosed embodiment is that it permits resources of the system to be maximized after it has been switched from the customer mode to a diagnostics mode. For example, upon switching the system from the diagnostics mode to the customer mode, a routine is provided in which all unnecessary diagnostic-related jobs residing in a system job database are deleted.

Yet another feature of the disclosed embodiment is that it permits network-related jobs to be diagnosed without disabling a network input of the system. Accordingly, diagnostics can be performed on the network input.

What is claimed is:

1. A method of performing a service on a job with a printing system in which the printing system is selectively operable in a first system mode and a second system mode, comprising the steps of:
programming the job with instructions for directing the printing system to perform a selected service on the job, said programming step being performed in a selected one of the first system mode and the second mode;
providing the job with a job tag for indicating the system mode in which the job was programmed;
determining in which system mode the printing system resides; and
comparing the job tag with the determined system mode prior to performing a print-related service on the job.

2. The method of claim 1, further comprising the step of inhibiting the service from being performed on the job when the system mode indicated by the job tag is different than the determined system mode.

3. The method of claim 1, further comprising the step of performing the service on the job when the system mode indicated by the job tag is the same as the determined system mode.

4. The method of claim 3, further comprising the step of switching the operation of the printing system from the first system mode to the second system mode while the service is being performed on the job.

5. The method of claim 4, further comprising the step of faulting the job upon which the service is being performed.

6. The method of claim 5, further comprising the steps of:
switching the operation of the printing system from the second system mode to the first system mode;
clearing the fault for the job upon which the service was being performed; and
resuming performance of service on the job.

7. The method of claim 1, further comprising the steps of:
performing a customer-related service in the first system mode; and
performing a diagnostic-related service in the second system mode.

8. A method of performing a service on a job with a printing system in which the printing system is selectively operable in a first system mode and a second system mode, comprising the steps of:
providing a job database containing a plurality of jobs, each of the jobs in the job database having a job tag for indicating the system mode in which the job was programmed;
selecting one of the plurality of jobs to perform a print-related service thereon;
determining in which system mode the printing system resides; and
comparing the job tag with the determined system mode prior to performing the print-related service on the job.

9. The method of claim 8, further comprising the step of deleting the job if the job tag is different than the determined system mode.

10. The method of claim 8, further comprising the steps of:
performing a customer-related service in the first system mode; and
performing a diagnostic-related service in the second system mode.

11. The method of claim 8, further comprising the step of performing the service on the job when the system mode indicated by the job tag is the same as the determined system mode.

12. The method of claim 11, in which the selected job is faulted, further comprising the step of clearing the fault associated with the selected job.

13. A method of performing a service on a network job with a selected job name, the network job being transmitted to a printing machine, which is selectively operable in a first system mode and a second system mode, by way of a network input, comprising the steps of:
disposing the printing machine in the second system mode;
receiving an indication that a network job with a job name is being transmitted to the printing machine while the printing machine is disposed in the second mode; and
determining whether the job name of the job being transmitted to the printing machine corresponds with a selected network job name.

14. The method of claim 13, further comprising the step of performing a diagnostic step with the network job.

15. The method of claim 13, further comprising the step of prohibiting the receiving of the network job at the printing machine when the job name of the job being transmitted to the printing machine does not correspond with the selected job name.

16. The method of claim 15, in which the job being transmitted to the printing machine originates from a remote workstation, further comprising the step of communicating a fault message to the remote workstation.

17. The method of claim 13, in which the job being transmitted to the printing machine is designated with the selected job name, further comprising the step of receiving the network job at the printing machine.

18. The method of claim 17, wherein said receiving step includes performing a diagnostic step with the network job.

19. The method of claim 17, in which a document is being scanned at the printing machine at the initiation of said receiving step, further comprising the step of storing the job being scanned for subsequent servicing thereof.

20. The method of claim 17, further comprising the step of storing the received network job.

* * * * *